US009755801B2

(12) United States Patent
Tanaka (10) Patent No.: US 9,755,801 B2
(45) Date of Patent: Sep. 5, 2017

(54) RECEIVING APPARATUS IN WIRELESS COMMUNICATION SYSTEM AND CHANNEL ESTIMATION CONTROL METHOD

(71) Applicant: NEC Corporation, Tokyo (JP)

(72) Inventor: Tomozou Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/776,754

(22) PCT Filed: Mar. 5, 2014

(86) PCT No.: PCT/JP2014/001206
§ 371 (c)(1),
(2) Date: Sep. 15, 2015

(87) PCT Pub. No.: WO2014/141628
PCT Pub. Date: Sep. 18, 2014

(65) Prior Publication Data
US 2016/0036573 A1    Feb. 4, 2016

(30) Foreign Application Priority Data

Mar. 15, 2013   (JP) .................................. 2013-054409

(51) Int. Cl.
*H04W 4/00*    (2009.01)
*H04L 5/00*    (2006.01)
(Continued)

(52) U.S. Cl.
CPC ........ *H04L 5/0048* (2013.01); *H04L 25/0202* (2013.01); *H04L 25/0224* (2013.01);
(Continued)

(58) Field of Classification Search
None
See application file for complete search history.

(56) References Cited

U.S. PATENT DOCUMENTS

2010/0124291 A1    5/2010  Muharemovic et al.
2010/0284394 A1   11/2010  Takata et al.
(Continued)

FOREIGN PATENT DOCUMENTS

EP    2429098        3/2012
JP    2011-097364    5/2011
(Continued)

OTHER PUBLICATIONS

International Search Report PCT/JP2014/001206 dated May 20, 2014.
(Continued)

*Primary Examiner* — Kibrom T Hailu
(74) *Attorney, Agent, or Firm* — Young & Thompson (57) ABSTRACT

It is desired to provide a receiving apparatus in a wireless communication system and a channel estimation control method that are capable of reducing delay in channel estimation and the error rate in decoding channel information. To achieve this, in a wireless communication system using a first reference signal, with which a control information signal is not multiplexed, and a second reference signal, with which a control information signal is multiplexed, a receiver (200) includes: an A/N detection selection unit (211) that selects whether to use both the first reference signal and the second reference signal for channel estimation or to use only the first reference signal for channel estimation; and a channel estimation unit (209) that carries out channel estimation by use of the selected reference signal(s).

10 Claims, 4 Drawing Sheets

(51) Int. Cl.
*H04L 25/02* (2006.01)
*H04W 24/02* (2009.01)
*H04W 72/04* (2009.01)

(52) U.S. Cl.
CPC ....... *H04W 24/02* (2013.01); *H04W 72/0406* (2013.01); *H04L 5/0055* (2013.01); *H04L 5/0057* (2013.01)

(56) References Cited

U.S. PATENT DOCUMENTS

| | | | | |
|---|---|---|---|---|
| 2011/0134901 | A1* | 6/2011 | Hoshino | H04B 7/0426 370/344 |
| 2012/0051319 | A1* | 3/2012 | Kwon | H04W 72/0406 370/329 |
| 2012/0218944 | A1* | 8/2012 | Okino | H04L 1/0033 370/328 |
| 2013/0083769 | A1* | 4/2013 | Qu | H04L 5/0016 370/330 |
| 2013/0265896 | A1* | 10/2013 | Mallik | H04W 72/08 370/252 |

FOREIGN PATENT DOCUMENTS

| | | |
|---|---|---|
| WO | 2009087741 | 7/2009 |
| WO | 2012103957 | 8/2012 |
| WO | 2012161082 | 11/2012 |

OTHER PUBLICATIONS

3GPP TS 36.211 v8.6.0.
Supplementary European Search Report dated Sep. 7, 2016 in corresponding European Patent Application No. 14764976.8.
Samsung: "Multiplexing CQI and ACK/NAK Transmission in E-UTRA UL", 3GPP Draft; R1-074097 UL Implicit A_N, 3rd Generation Partnership Project (3GPP), Mobile Competence Centre; 650, Route Des Lucioles; F-06921 Sophia-Antipolis Cedex, France, vol. RAN WG1, No. Shanghai, China, Oct. 2, 2007, XP050107634.
Motorola: "Performance of RS Embedded ACK/NACK", 3GPP Draft, R1-080083, 3rd Generation Partnership Project (3GPP), Mobile Competence Centre, 650, Route Des Lucioles, F-06921 Sophia-Antipolis Cedex, France, vol. RAN WG1, No. Sevilla, Spain, Jan. 8, 2008, XP050108621.

* cited by examiner

Fig.2

RECEIVING APPARATUS IN WIRELESS COMMUNICATION SYSTEM AND CHANNEL ESTIMATION CONTROL METHOD

TECHNICAL FIELD

The present invention relates to a wireless communication system using a reference signal with which a control information signal is multiplexed, and relates particularly to a receiving apparatus in the wireless communication system and a channel estimation control method.

BACKGROUND ART

In Evolved Universal Terrestrial Radio Access (E-UTRA) specified in 3GPP, an acknowledgement (ACK) signal or a negative acknowledgement (NACK) signal and a channel quality information (CQI) signal, which are control information, are transmitted by use of a physical uplink control channel (PUCCH). In the following description, an ACK signal and a NACK signal are both referred to as A/N signal in short for convenience.

When cyclic prefix (CP) is normal mode and PUCCH is format 2, only CQI signals are multiplexed. In contrast, when CP is normal mode and PUCCH is format 2a or format 2b, a CQI signal and an A/N signal are multiplexed in a same subframe (refer to Chapter 5.4.2 of NPL 1).

Figure 1:
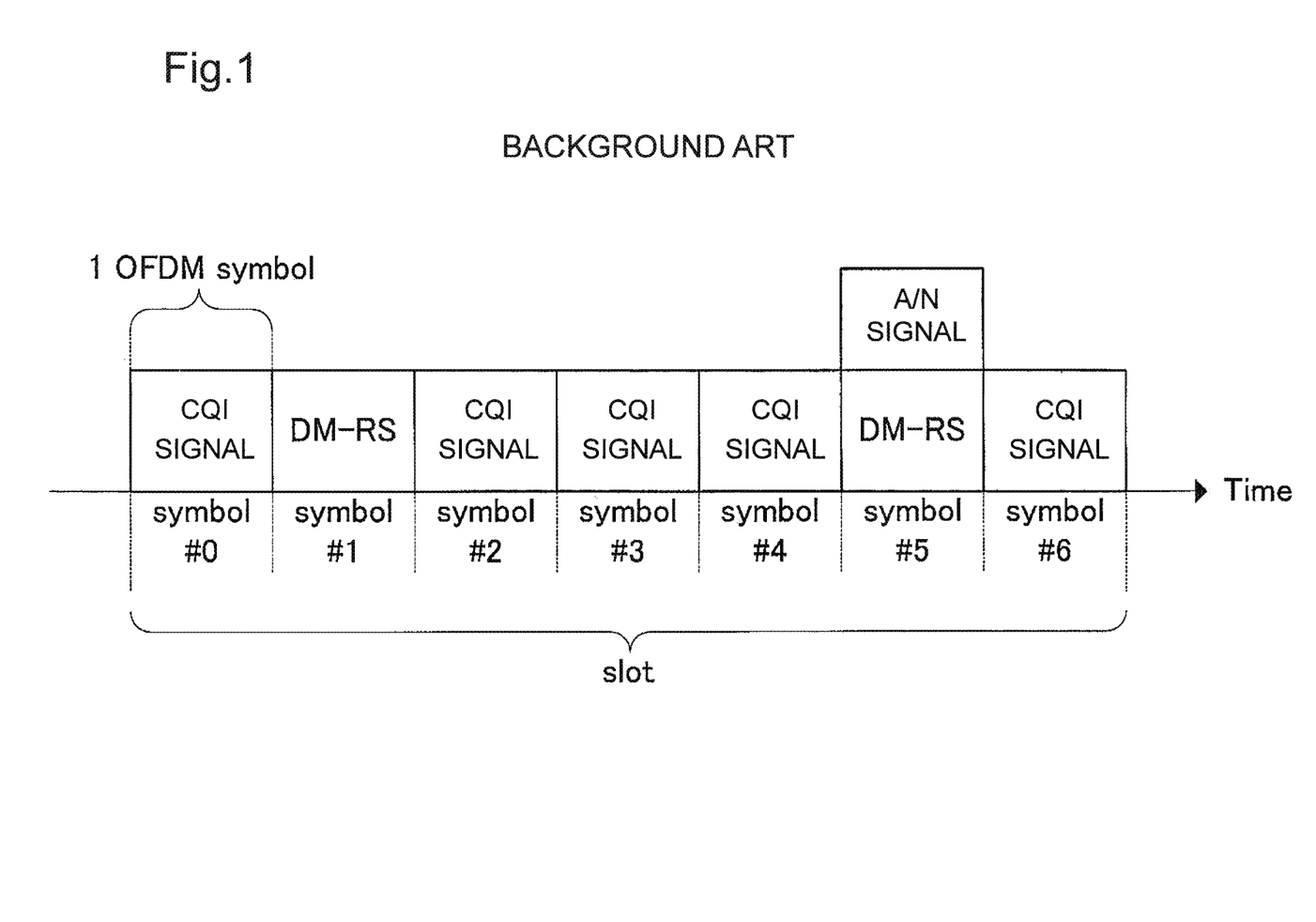
FIG. 1 is a diagram illustrating a format of a slot.

As illustrated in FIG. 1, an A/N signal is multiplexed into an OFDM symbol that is assigned to a reference signal in the latter half (=OFDM symbol number #5) of a slot. Here, the OFDM denotes orthogonal frequency division multiplexing. In the following description, a reference signal for demodulation is referred to as DM-RS (i.e., demodulation reference signal).

As illustrated in FIG. 1, upon receipt of a radio signal in which a DM-RS and an A/N signal are multiplexed, a receiver detects the A/N signal, which is multiplexed with a reference signal, carries out CQI channel estimation by use of the reference signal from which the A/N signal is removed, and uses estimated channel characteristics for demodulation of CQI signals. In order to reduce the influence of false detection of an A/N signal in such A/N detection, a wireless base station has been suggested (PTL 1). The wireless base station includes A/N detection units that have different criteria for detection upon which to determine whether the A/N signal is ACK or NACK, and equalizes the received DM-RSs in the first half and the latter half (OFDM symbol numbers #1 and #5) of the slot, so that noise is reduced.

CITATION LIST

Patent Literature

PTL 1: Japanese Unexamined Patent Application Publication No. 2011-097364

Non Patent Literature

NPL 1: 3GPP TS 36.211 v8.6.0

SUMMARY OF INVENTION

Technical Problem

However, PTL 1 mentioned above has a complex structure because it is necessary to calculate both of the received DM-RSs in the first half and the latter half (OFDM symbol numbers #1 and #5) of the slot and to provide two A/N detection units that have different criteria for detection of ACK and NACK.

In addition to the above, the calculation in PTL 1 described above uses both of the received DM-RSs in the first half and the latter half (OFDM symbol numbers #1 and #5) of the slot. Accordingly, even when a more appropriate CQI channel estimation can be achieved by using only the received DM-RS in the first half of the slot, with which the received A/N signal is not multiplexed, such detection using only the received DM-RS in the first half is not possible. For this reason, it is difficult to reduce, for example, delay in CQI channel estimation and the error rate in decoded CQI information bits.

In view of these, the present invention aims to provide a receiving apparatus in a wireless communication system and a channel estimation control method that are capable of reducing delay in channel estimation and the error rate in decoded channel information.

Solution to Problem

A receiving apparatus according to the present invention is included in a wireless communication system using a first reference signal, with which a control information signal is not multiplexed, and a second reference signal, with which a control information signal is multiplexed, and includes: a selection means that selects whether to use both the first reference signal and the second reference signal for channel estimation or to use only the first reference signal for channel estimation; and a channel estimation means that carries out channel estimation by use of the selected one or more reference signals.

A channel estimation control method according to the present invention is for a receiving apparatus in a wireless communication system using a first reference signal, with which a control information signal is not multiplexed, and a second reference signal, with which a control information signal is multiplexed, and includes: a selection unit selecting whether to use both the first reference signal and the second reference signal for channel estimation or to use only the first reference signal for channel estimation; and carrying out channel estimation by use of the selected one or more reference signals.

A wireless communication system according to the present invention includes at least one transmitter and at least one receiver, therefore, the transmitter transmits a transmission signal including a first reference signal, with which a control information signal is not multiplexed, and a second reference signal, with which a control information signal is multiplexed. The receiver selects whether to use both the first reference signal and the second reference signal for channel estimation or to use only the first reference signal for channel estimation, and carries out channel estimation by use of the selected one or more reference signals.

Advantageous Effects of Invention

The present invention is capable of reducing delay in channel estimation and the error rate in decoded channel information by selecting whether to use both a first reference signal and a second reference signal for channel estimation or to use only the first reference signal for channel estimation.

DESCRIPTION OF EMBODIMENTS

According to an exemplary embodiment of the present invention, a received DM-RS to be used for calculation are appropriately selected, from a received DM-RS that is in the first half of a slot and with which a received A/N signal is not multiplexed and a received DM-RS that is in the latter half of the slot and with which a received A/N signal is multiplexed, depending on the reception status of the received A/N signal. And then a CQI channel estimation value is calculated. More specifically, it is determined, depending on the reception status of the received A/N signal, whether to use both the received DM-RS that is in the first half of the slot and with which the received A/N signal is not multiplexed and the received DM-RS that is in the latter half of the slot and with which the received A/N signal is multiplexed, or to use only the received DM-RS that is in the first half of the slot and with which the received A/N signal is not multiplexed. This is capable of carrying out CQI channel estimation by using only the received DM-RS that is in the first half of the slot and with which the received A/N signal is not multiplexed, so that delay in the CQI channel estimation and the error rate in decoded CQI information bits can be reduced. Note that, although an A/N signal is used as an example of a control information signal in the present exemplary embodiment, a control information signal is not limited to this and the present invention is similarly applicable to a case of using, for example, a CQI signal as a control information signal. Detailed description is given below of a receiving apparatus and a reception method according to an exemplary embodiment of the present invention with reference to the drawings.

1. Configuration

Figure 2:
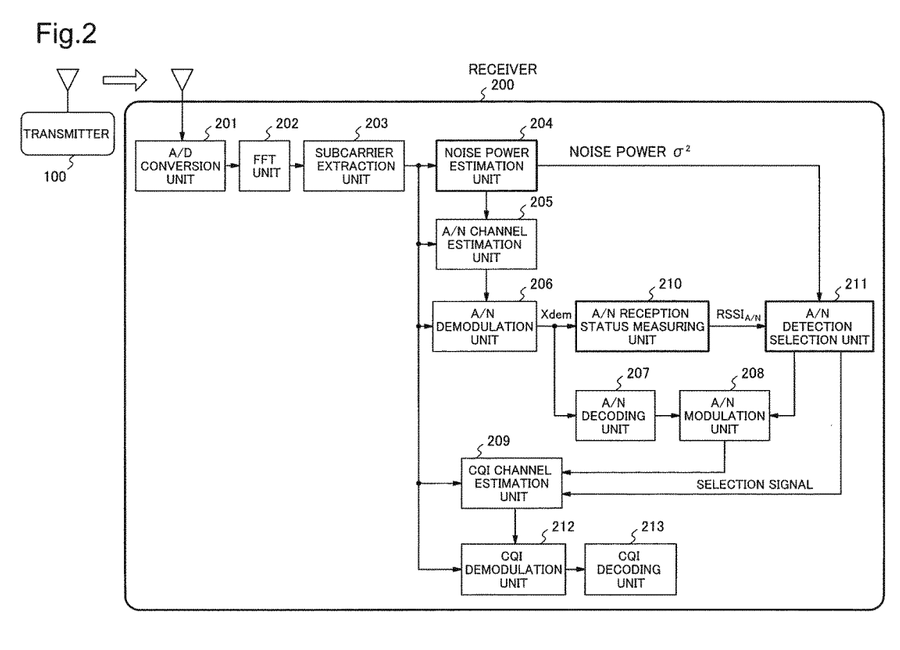
FIG. 2 is a block diagram illustrating a functional configuration of a receiving apparatus according to an exemplary embodiment of the present invention.

As illustrated in FIG. 2, a wireless communication system according to the exemplary embodiment of the present invention includes a single transmitter 100 and a single receiver 200. It is assumed that the transmitter 100 transmits, to the receiver 200, a time-domain signal in which DM-RSs, an A/N signal, and CQI signals are multiplexed in a format such as PUCCH format 2a or PUCCH format 2b (refer to FIG. 1). The signal transmitted by the transmitter 100 normally reaches the receiver 200 while being affected by the propagation path and the like.

The receiver 200 includes an analog-to-digital (A/D) conversion unit 201, a Fast Fourier Transform (FFT) unit 202, a subcarrier extraction unit 203, a noise power estimation unit 204, an A/N channel estimation unit 205, an A/N demodulation unit 206, an A/N decoding unit 207, an A/N modulation unit 208, a CQI channel estimation unit 209, an A/N reception status measuring unit 210, an A/N detection selection unit 211, a CQI demodulation unit 212, and a CQI decoding unit 213.

The A/D conversion unit 201 converts the received time-domain signal affected by the propagation path and the like, into a digital signal and outputs the digital signal to the FFT unit 202. The FFT unit 202 transforms the received time-domain signal input by the A/D conversion unit 201, into a received frequency-domain signal through FFT processing and outputs the received frequency-domain signal obtained by the transform, to the subcarrier extraction unit 203.

The subcarrier extraction unit 203 extracts a subcarrier in which received DM-RSs, a received A/N signal, and received CQI signals are multiplexed, from the received frequency-domain signal input by the FFT unit 202. The received DM-RSs in the first half and the latter half of the slot are output to the noise power estimation unit 204 and the CQI channel estimation unit 209. The received DM-RS that is in the first half of the slot and with which the received A/N signal is not multiplexed (referred to as received DM-RS in the first half of the slot, below) is output to the A/N channel estimation unit 205. The received DM-RS that is in the latter half of the slot and with which the received A/N signal is multiplexed (referred to as received DM-RS in the latter half of the slot, below) is output to the A/N demodulation unit 206. The received CQI signals are output to the noise power estimation unit 204 and the CQI demodulation unit 212.

The noise power estimation unit 204 calculates a noise power $\sigma^2$ from the received DM-RS signals and the received CQI signals, which are input by the subcarrier extraction unit 203, and outputs the calculated noise power $\sigma^2$ to the A/N detection selection unit 211.

The A/N channel estimation unit 205 calculates an A/N channel estimation value from the received DM-RS in the first half of the slot input by the subcarrier extraction unit 203 and outputs the calculated A/N channel estimation value to the A/N demodulation unit 206.

The A/N demodulation unit 206 removes DM-RS components from the received DM-RS in the latter half of the slot input by the subcarrier extraction unit 203 and despreads the obtained signal. The A/N demodulation unit 206 corrects signal distortion caused by, for example, fluctuation in the propagation path, by using the A/N channel estimation value input by the A/N channel estimation unit 205 and thereby generates a demodulated A/N signal $X_{dem}$. The generated demodulated A/N signal $X_{dem}$ is output to the A/N reception status measuring unit 210 and the A/N decoding unit 207.

By decoding the demodulated A/N signal $X_{dem}$ input by the A/N demodulation unit 206, the A/N decoding unit 207 generates decoded A/N information bits, and outputs the generated decoded A/N information bits to the A/N modulation unit 208.

The A/N modulation unit 208 carries out, for the decoded A/N information bits input by the A/N decoding unit 207, binary phase shift keying (BPSK) modulation in the case of using PUCCH format 2a or quadrature phase shift keying (QPSK) modulation in the case of using PUCCH format 2b, and outputs a modulated A/N signal obtained by the modulation, to the CQI channel estimation unit 209. If the reception status of the A/N signal deteriorates, by control from the A/N detection selection unit 211, the process for the received DM-RS that is in the latter half of the slot and with which the received A/N is multiplexed is omitted.

The A/N reception status measuring unit 210 calculates an A/N reception level $RSSI_{A/N}$ from the demodulated A/N signal $X_{dem}$ input by the A/N demodulation unit 206 and outputs to the A/N detection selection unit 211.

The A/N detection selection unit 211 makes decisions about how to select the received DM-RSs in the first half and the latter half of the slot on the basis of the noise power $\sigma^2$ input by the noise power estimation unit 204 and the A/N reception level $RSSI_{A/N}$ input by the A/N reception status measuring unit 210, and outputs a selection signal to the CQI channel estimation unit 209. If deterioration in reception status of the A/N signal is detected, the A/N detection selection unit 211 controls the A/N modulation unit 208 so that the A/N modulation unit 208 omits the process for the received DM-RS that is in the latter half of the slot and with which the received A/N is multiplexed.

In the CQI channel estimation unit 209, the received DM-RSs in the first half and the latter half of the slot from the subcarrier extraction unit 203 and the modulated A/N signal from the A/N modulation unit 208 are input respectively. Then, the CQI channel estimation unit 209 calculates a CQI channel estimation value by use of both of the received DM-RSs in the first half and the latter half of the slot or only the received DM-RS in the first half of the slot, according to the selection signal from the A/N detection selection unit 211. The CQI channel estimation unit 209 outputs the calculated CQI channel estimation value to the CQI demodulation unit 212.

In the CQI demodulation unit 212, the received CQI signals from the subcarrier extraction unit 203 and the CQI channel estimation value from the CQI channel estimation unit 209 are input respectively. The CQI demodulation unit 212 generates a demodulated CQI signal correcting distortion of each of the received CQI signals caused by, for example, fluctuation in the propagation path by the use of the CQI channel estimation value and dispreading the obtained signal. The generated demodulated CQI signal is output to the CQI decoding unit 213. Then, the CQI decoding unit 213 generates decoded CQI information bits decoding the input demodulated CQI signal.

2. Operation

Next, a control channel receiving method for the receiving apparatus according to the present exemplary embodiment is more concretely described with reference to FIG. 3.

Figure 3:
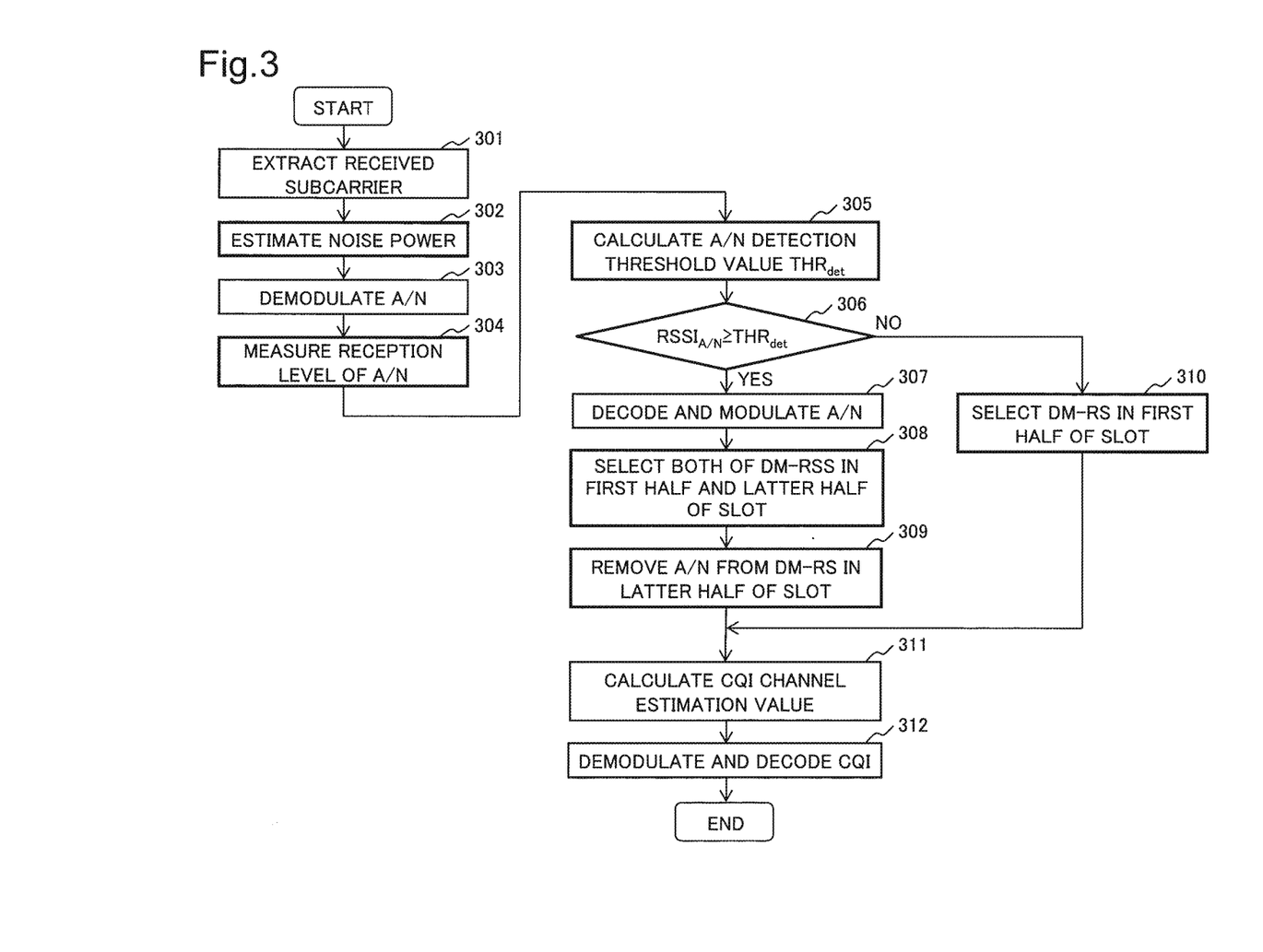
FIG. 3 is a flowchart illustrating a control channel receiving method according to the present exemplary embodiment.

In FIG. 3, first, upon receipt of a transmitted time-domain signal in which DM-RSs, an A/N signal, and CQI signals are multiplexed, the A/D conversion unit 201 converts the received time-domain signal into a digital signal through A/D conversion. Then, the FFT unit 202 transforms the received time-domain signal into a frequency domain through FFT processing. The subcarrier extraction unit 203 extracts the received DM-RSs, the received A/N signal, and the received CQI signals from the received frequency-domain signal (Operation 301).

Subsequently, the noise power estimation unit 204 calculates a noise power $\sigma^2$ by using the received DM-RSs, the received A/N signal, and the received CQI signals (Operation 302) and outputs the noise power $\sigma^2$ to the A/N detection selection unit 211.

The A/N channel estimation unit 205 calculates an A/N channel estimation value by use of the received DM-RS in the first half of the slot. The A/N demodulation unit 206 corrects distortion of the received DM-RS in the latter half of the slot caused by, for example, fluctuation in the propagation path and dispreads the obtained signal, using the A/N channel estimation value. Consequently, the A/N demodulation unit 206 generates a demodulated A/N signal $X_{dem}$ (Operation 303).

The A/N reception status measuring unit 210 calculates an A/N reception level $RSSI_{A/N}$ by using the demodulated A/N signal $X_{dem}$ as follows (Operation 304).

In the case of using PUCCH format 2a, the A/N reception level $RSSI_{A/N}$ is calculated according to Equation (1) below.

$$RSSI_{A/N} = |real(X_{dem})|^2 \quad (1)$$

where real( ) indicates extraction of the real part of the complex number in the parentheses.

In the case of using PUCCH format 2b, the A/N reception level $RSSI_{A/N}$ is calculated according to Equation (2) or (3) below.

[Math 1]

$$\text{if } (|real(X_{dem})| \geq |imag(X_{dem})|) \quad (2)$$
$$RSSI = |real(X_{dem})|^2$$
$$\text{else}$$
$$RSSI = |imag(X_{dem})|^2$$

[Math 2]

$$\text{if } (|real(X_{dem})| \geq |imag(X_{dem})|) \quad (3)$$
$$RSSI = \frac{|real(X_{dem})|^2}{|imag(X_{dem})|^2}$$
$$\text{else}$$
$$RSSI = \frac{|imag(X_{dem})|^2}{|real(X_{dem})|^2}$$

where imag( ) indicates extraction of the imaginary part of the complex number in the parentheses. The calculated A/N reception level $RSSI_{A/N}$ is output to the A/N detection selection unit 211.

After the above, the A/N detection selection unit 211 calculates a detection threshold value $THR_{det}$ by using the noise power $\sigma^2$ input by the noise power estimation unit 204, as follows (Operation 305).

In the case of calculating the A/N reception level $RSSI_{A/N}$ according to Equation (1) or (2) described above, the A/N detection selection unit 211 calculates the detection threshold value $THR_{det}$ according to Equation (4) below.

[Math 3]

$$THR_{det} = \sigma^2 \cdot 10^{-\frac{thr_{det,rel}}{10}} \quad (4)$$

where $thr_{det,rel}$ indicates a relative detection threshold value [dB], which gives an arbitrary value as a parameter.

In contrast, in the case of calculating the A/N reception level $RSSI_{A/N}$ according to Equation (3), the A/N detection selection unit 211 calculates the detection threshold value $THR_{det}$ according to Equation (5) below.

[Math 4]

$$THR_{det} = 10^{-\frac{thr_{det,rel}}{10}} \quad (5)$$

Subsequently, the A/N detection selection unit 211 compares the A/N reception level $RSSI_{A/N}$ and the detection threshold value $THR_{det}$ (Operation 306). When $RSSI_{A/N} \geq THR_{det}$ (YES in Operation 306), the A/N detection selection unit 211 notifies a first selection signal, which indicates that the received DM-RS in the latter half of the slot is to be used for calculation of a CQI channel estimation value, (a selection signal for selecting both of the received DM-RSs in the first half and the latter half of the slot) to the A/N modulation unit 208 and the CQI channel estimation unit 209. When $RSSI_{A/N} < THR_{det}$ (NO in Operation 306), the A/N detection selection unit 211 notifies a second selection signal, which indicates that the received DM-RS in the latter half of the slot is not to be used for calculation of a CQI channel estimation value, (a selection signal for selecting only the DM-RS in the first half of the slot) to the A/N modulation unit 208 and the CQI channel estimation unit 209.

The A/N decoding unit 207 decodes the demodulated A/N signal $X_{dem}$ and thereby generates decoded A/N information bits. The A/N modulation unit 208 carries out BPSK modulation in the case of using PUCCH format 2a by use of decoded A/N information bits and thereby generates the A/N modulated A/N signal. Alternatively, the A/N modulation unit 208 carries out QPSK modulation in the case of using PUCCH format 2b by use of decoded A/N information bits and thereby generates the modulated A/N signal (Operation 307). However, if the reception status of the A/N signal deteriorates, the process for the received DM-RS that is in the latter half of the slot and with which the received A/N is multiplexed is omitted by the controlling from the A/N detection selection unit 211.

When the CQI channel estimation unit 209 is notified that the received DM-RS in the latter half of the slot is to be used for calculation of a CQI channel estimation value, the CQI channel estimation unit 209 selects both of the received DM-RSs in the first half and the latter half of the slot (Operation 308). Then, the CQI channel estimation unit 209 removes the received A/N signal from the received DM-RS in the latter half of the slot (Operation 309). Thereafter, the CQI channel estimation unit 209 calculates a CQI channel estimation value by use of both of the received DM-RSs in the first half and the latter half of the slot (Operation 311). In contrast, when the CQI channel estimation unit 209 is notified that the received DM-RS in the latter half of the slot is not to be used for calculation of a CQI channel estimation value (Operation 310), the CQI channel estimation unit 209 calculates a CQI channel estimation value by use of only the received DM-RSs in the first half of the slot (Operation 311). The CQI channel estimation value calculated as the above is output to the CQI demodulation unit 212.

In the CQI demodulation unit 212, the received CQI signals from the subcarrier extraction unit 203 and the CQI channel estimation value from the CQI channel estimation unit 209 are input respectively. Then, the CQI demodulation unit 212 generates a demodulated CQI signal correcting distortion of each of the received CQI signals caused by, for example, fluctuation in the propagation path, by the use of the CQI channel estimation value and dispreading the obtained signal, and outputs the demodulated CQI signal to the CQI decoding unit 213. The CQI decoding unit 213 generates decoded CQI information bits decoding the input demodulated CQI signal (Operation 312).

3. Effects

As described above, according to the present exemplary embodiment of the present invention, it is possible to reduce the occurrence of errors in the decoded CQI information bits. The reason is that whether to use, for generation of a CQI channel estimation value, a received DM-RS in which an A/N signal is multiplexed is determined according to the reception status of the received A/N signal. Thereby, the present exemplary embodiment of the present invention makes it possible to generate a highly accurate CQI channel estimation value.

Figure 4:
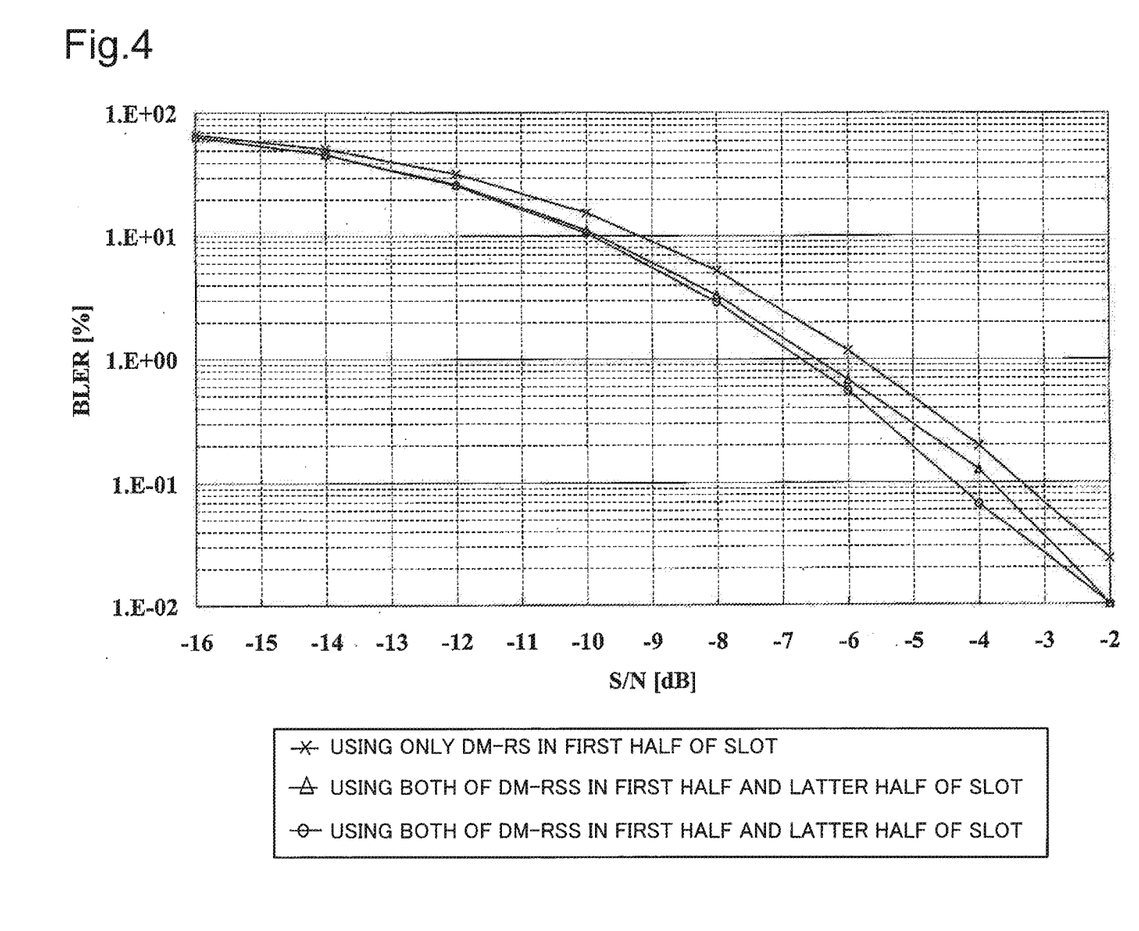
FIG. 4 is a graph for comparing a known example and the present exemplary embodiment in terms of error rate in decoded CQI information.

As presented in FIG. 4, according to the present exemplary embodiment, it is understood that the occurrence of errors in decoded CQI information bits is reduced in the case of signal reception using PUCCH format 2a. In FIG. 4, S/N on the horizontal axis indicates the ratio of the desired-signal power to the noise component power. BLER on the vertical axis indicates the error probability of CQI blocks. In addition, "using only DM-RS in first half of slot" provided as a legend indicates that a CQI channel estimation value is calculated by use of a received DM-RS in the first half of a slot in a conventional case. "Using both of DM-RSs in first half and latter half of slot" provided as a legend indicates that a CQI channel estimation value is calculated by use of received DM-RSs in the first half and the latter half of a slot in a conventional case. It is understood, from FIG. 4, that BLER in the case of using the present exemplary embodiment is most ideal.

In addition to the above, according to the present exemplary embodiment, process delay is reduced. The reason is that, when the reception status of a received A/N signal is poor, which is likely to cause errors in decoded A/N information bits, the A/N modulation unit 208 and the CQI channel estimation unit 209 omit the process for a received DM-RS that is in the latter half of a slot and with which a received A/N is multiplexed.

4. Supplementary Notes

Part of or the entire of the above-described exemplary embodiment may be described as in the following supplementary notes, although the present invention is not limited thereto.

(Supplementary Note 1)

A receiving apparatus in a wireless communication system using a first reference signal, with which a control information signal is not multiplexed, and a second reference signal, with which a control information signal is multiplexed, the receiving apparatus including:

a selection means that selects whether to use both the first reference signal and the second reference signal for channel estimation or to use only the first reference signal for channel estimation; and a channel estimation means that carries out channel estimation by use of the selected one or ones of the reference signals.

(Supplementary Note 2)

The receiving apparatus according to Supplementary Note 1, wherein the selection means selects the one or ones of the reference signals to be used for the channel estimation, on the basis of reception status of the control information signal.

(Supplementary Note 3)

The receiving apparatus according to Supplementary Note 2, wherein the selection means measures a reception level of the control information signal and selects the one or ones of the reference signals to be used for the channel estimation, according to a result of comparison between the reception level and a predetermined threshold value.

(Supplementary Note 4)

The receiving apparatus according to Supplementary Note 2 or 3, wherein the selection means optimizes the number of reference signals to be used for the channel estimation, on the basis of the reception status of the control information signal.

(Supplementary Note 5)

A channel estimation control method for a receiving apparatus in a wireless communication system using a first reference signal, with which a control information signal is not multiplexed, and a second reference signal, with which a control information signal is multiplexed, the channel estimation control method including:

a selection means selecting whether to use both the first reference signal and the second reference signal for channel estimation or to use only the first reference signal for channel estimation; and carrying out channel estimation by use of the selected one or ones of the reference signals.

(Supplementary Note 6)

The channel estimation control method according to Supplementary Note 1, wherein the selection means selects the one or ones of the reference signals to be used for the channel estimation, on the basis of reception status of the control information signal.

(Supplementary Note 7)

The channel estimation control method according to Supplementary Note 6, wherein the selection means measures a reception level of the control information signal and selects the one or ones of the reference signals to be used for the channel estimation, according to a result of comparison between the reception level and a predetermined threshold value.

(Supplementary Note 8)

The channel estimation control method according to Supplementary Note 6 or 7, wherein the selection means optimizes the number of reference signals to be used for the channel estimation, on the basis of the reception status of the control information signal.

(Supplementary Note 9)

A wireless communication system including:
at least one transmitter; and
at least one receiver, wherein
the transmitter transmits a transmission signal including a first reference signal, with which a control information signal is not multiplexed, and a second reference signal, with which a control information signal is multiplexed, and
the receiver selects whether to use both the first reference signal and the second reference signal for channel estimation or to use only the first reference signal for channel estimation, and carries out channel estimation by use of the selected one or ones of the reference signals.

(Supplementary Note 10)

The wireless communication system according to Supplementary Note 9, wherein the receiver selects the one or ones of the reference signals to be used for the channel estimation, on the basis of reception status of the control information signal.

(Supplementary Note 11)

The wireless communication system according to Supplementary Note 10, wherein the receiver measures a reception level of the control information signal and selects the one or ones of the reference signals to be used for the channel estimation, according to a result of comparison between the reception level and a predetermined threshold value.

(Supplementary Note 12)

The wireless communication system according to Supplementary Note 10 or 11, wherein the receiver optimizes the number of reference signals to be used for the channel estimation, on the basis of the reception status of the control information signal.

(Supplementary Note 13)

A program that irritates a computer yesterday as a receiving apparatus in a wireless communication system using a first reference signal, with which a control information signal is not multiplexed, and a second reference signal, with which a control information signal is multiplexed, the program implementing, by the computer:
a selection function for selecting whether to use both the first reference signal and the second reference signal for channel estimation or to use only the first reference signal for channel estimation; and
a channel estimation function for carrying out channel estimation by use of the selected one or ones of the reference signals.

(Supplementary Note 14)

The program according to Supplementary Note 13, wherein the selection function selects the one or ones of the reference signals to be used for the channel estimation, on the basis of reception status of the control information signal.

INDUSTRIAL APPLICABILITY

The present invention is applicable to, for example, a wireless base station in a PUCCH receiving system using a reference signal with which an ACK signal or a NACK signal is multiplexed.

REFERENCE SIGNS LIST

100 Transmitter
200 Receiver
201 A/D conversion unit
202 FFT unit
203 Subcarrier extraction unit
204 Noise power estimation unit
205 A/N channel estimation unit
206 A/N demodulation unit
207 A/N decoding unit
208 A/N modulation unit
209 CQI channel estimation unit
210 A/N reception status measuring unit
211 A/N detection selection unit
212 CQI demodulation unit
213 CQI decoding unit

The invention claimed is:

1. A receiving apparatus in a wireless communication system, the receiving apparatus comprising:
   a selection unit that is configured to select whether
   i) to use both a first uplink reference signal with which a control information is not multiplexed and a second uplink reference signal with which the control information signal is multiplexed for channel estimation or
   ii) to use the first uplink reference signal for the channel estimation without using the second uplink reference signal; and
   a channel estimation unit that is configured to carry out the channel estimation by use of the selected one or more uplink reference signals.

2. The receiving apparatus according to claim 1,
   wherein the selection unit is configured to select the one or more uplink reference signals to be used for the channel estimation, based on reception status of the control information signal.

3. The receiving apparatus according to claim 2,
   wherein the selection unit is configured to measure a received signal strength of the control information signal and select the one or more uplink reference signals to be used for the channel estimation, according to a result of comparison between the received signal strength and a predetermined threshold value.

4. The receiving apparatus according to claim 2,
   wherein the selection unit is configured to optimize a number of uplink reference signals to be used for the channel estimation, based on the reception status of the control information signal.

5. A control method for a receiving apparatus in a wireless communication system, the control method comprising:
   selecting whether i) to use both a first uplink reference signal with which a control information is not multiplexed and a second uplink reference signal with which the control information signal is multiplexed for channel estimation or ii) to use only the first uplink reference signal for the channel estimation without using the second uplink reference signal; and carrying out the channel estimation by use of the selected one or more uplink reference signals.

6. The control method according to claim 5, wherein the one or more uplink reference signals to be used for the channel estimation are selected based on reception status of the control information signal.

7. The control method according to claim 6, further comprising measuring a received signal strength of the control information signal and selecting the one or more uplink reference signals to be used for the channel estimation, according to a result of comparison between the a received signal strength and a predetermined threshold value.

8. The control method according to claim 6, further comprising optimizing a number of uplink reference signals to be used for the channel estimation, based on the reception status of the control information signal.

9. A wireless communication system comprising:
at least one transmitter; and
at least one receiver,
wherein the transmitter is configured to transmit a transmission signal including a first uplink reference signal, with which a control information signal is not multiplexed, and a second uplink reference signal, with which a control information signal is multiplexed, and
wherein the receiver is configured to select whether i) to use both the uplink first reference signal with which the control information is not multiplexed and the second uplink reference signal with which the control information signal is multiplexed for channel estimation or ii) to use only the first uplink reference signal for the channel estimation without using the second uplink reference signal, and carry out the channel estimation by use of the selected one or more uplink reference signals.

10. A receiving apparatus in a wireless communication system, the receiving apparatus comprising:
a receiver that is configured to receive a first uplink reference signal, with which a control information signal is not multiplexed, and a second uplink reference signal, with which a control information signal is multiplexed; and
a processor that is configured to select whether i) to use both the first uplink reference signal with which the control information is not multiplexed and the second uplink reference signal with which the control information signal is multiplexed for channel estimation or ii) to use the first uplink reference signal for the channel estimation without using the second uplink reference signal, and to carry out the channel estimation by use of the selected one or more uplink reference signals.

* * * * *